United States Patent
Robinson

(10) Patent No.: US 8,762,573 B2
(45) Date of Patent: Jun. 24, 2014

(54) REVERSE DNS LOOKUP WITH MODIFIED REVERSE MAPPINGS

(75) Inventor: Gary Robinson, Magherafelt (GB)

(73) Assignee: Openwave Mobility, Inc., Redwood City, CA (US)

( * ) Notice: Subject to any disclaimer, the term of this patent is extended or adjusted under 35 U.S.C. 154(b) by 303 days.

(21) Appl. No.: 13/078,840

(22) Filed: Apr. 1, 2011

(65) Prior Publication Data

US 2012/0079055 A1 Mar. 29, 2012

Related U.S. Application Data

(60) Provisional application No. 61/320,711, filed on Apr. 3, 2010, provisional application No. 61/329,233, filed on Apr. 29, 2010.

(51) Int. Cl.
*G06F 15/16* (2006.01)
*G06F 15/173* (2006.01)

(52) U.S. Cl.
USPC ............ 709/245; 709/213; 709/218; 709/238

(58) Field of Classification Search
USPC .......... 709/223–227, 238–245, 213, 217–219
See application file for complete search history.

(56) References Cited

U.S. PATENT DOCUMENTS

| | | | |
|---|---|---|---|
| 6,330,605 B1 | 12/2001 | Christensen et al. | |
| 7,343,397 B2 | 3/2008 | Kochanski | |
| 7,680,954 B2* | 3/2010 | Zhang | 709/245 |
| 2002/0013858 A1 | 1/2002 | Anderson | |
| 2005/0021841 A1 | 1/2005 | Yoshimoto | |
| 2006/0031921 A1* | 2/2006 | Danforth et al. | 726/1 |
| 2006/0112176 A1 | 5/2006 | Liu et al. | |
| 2009/0164597 A1 | 6/2009 | Shuster | |
| 2012/0324089 A1* | 12/2012 | Joshi | 709/223 |

OTHER PUBLICATIONS

International Search Report and Written Opinion, PCT/US11/30990, Jun. 13, 2011.

* cited by examiner

*Primary Examiner* — Yasin Barqadle

(57) ABSTRACT

In accordance with the invention, embodiments of a DNS server, a DNS proxy process, and an intermediate server (IMS) are described. The DNS server, DNS proxy process, and intermediate server (IMS) described herein utilize a source IP address for a client device, in combination with a destination IP address for a host server, in reverse mapping operations in order to accurately provide a hostname originally requested by the client device.

19 Claims, 8 Drawing Sheets

REVERSE DNS LOOKUP WITH MODIFIED REVERSE MAPPINGS

CROSS-REFERENCE TO RELATED APPLICATIONS

This application claims the benefit of U.S. Provisional Application No. 61/320,711, filed on Apr. 3, 2010, entitled, "Reverse DNS Lookup with Modified Reverse Mappings" which is incorporated by reference herein in its entirety. This application also claims the benefit of U.S. Provisional Application No. 61/329,233, filed on Apr. 29, 2010, entitled, "On-The-Fly Reverse Mapping" which is incorporated by reference herein in its entirety. This application is also related to the application, entitled "On-The-Fly Reverse Mapping" that is to be filed on the same day as the present application, now U.S. application Ser. No. 13/078,844, filed Apr. 1, 2011.

BACKGROUND

A domain name system (DNS) server functions to provide a destination internet protocol (IP) address for a given host domain name (or simply hostname). For example, a DNS server may provide the destination IP address 10.20.30.40 for the hostname "www.example.com." This functionality is referred to as a forward DNS lookup (or simply DNS lookup or forward mapping) and makes it possible for a user of a client device to contact a host server based on knowledge of the hostname, rather than requiring the user to know the destination IP address of the host server.

There is also a conventional process for implementing a reverse DNS lookup (or reverse mapping), in which the destination IP address can be used to obtain the corresponding hostname. However, the reverse mapping often fails to provide accurate information because there is no requirement that the reverse mapping correspond with the forward mapping. Also, the forward and reverse mappings are often managed by different entities. Additionally, there are many situations where there is no reverse mapping available, so the reverse mapping returns an indication that there is no hostname corresponding to the destination IP address. In other situations, multiple hostnames may be mapped to the same destination IP address, so the reverse mapping may return a different hostname, other than the hostname originally used by the client device. These and other problems with conventional reverse mapping make it difficult for an internet service provider (ISP) to accurately track the actual hostnames that are requested by a particular client device. Consequently, it is difficult, for example, to properly manage the permissions for the user on the client device.

SUMMARY

In accordance with the invention, embodiments of a DNS server, a DNS proxy process, and an intermediate server (IMS) are described. The embodiments described herein utilize a source IP address for the client device, in combination with the destination IP address for the host server, in the reverse mapping operations in order to accurately provide the hostname requested by the client device. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
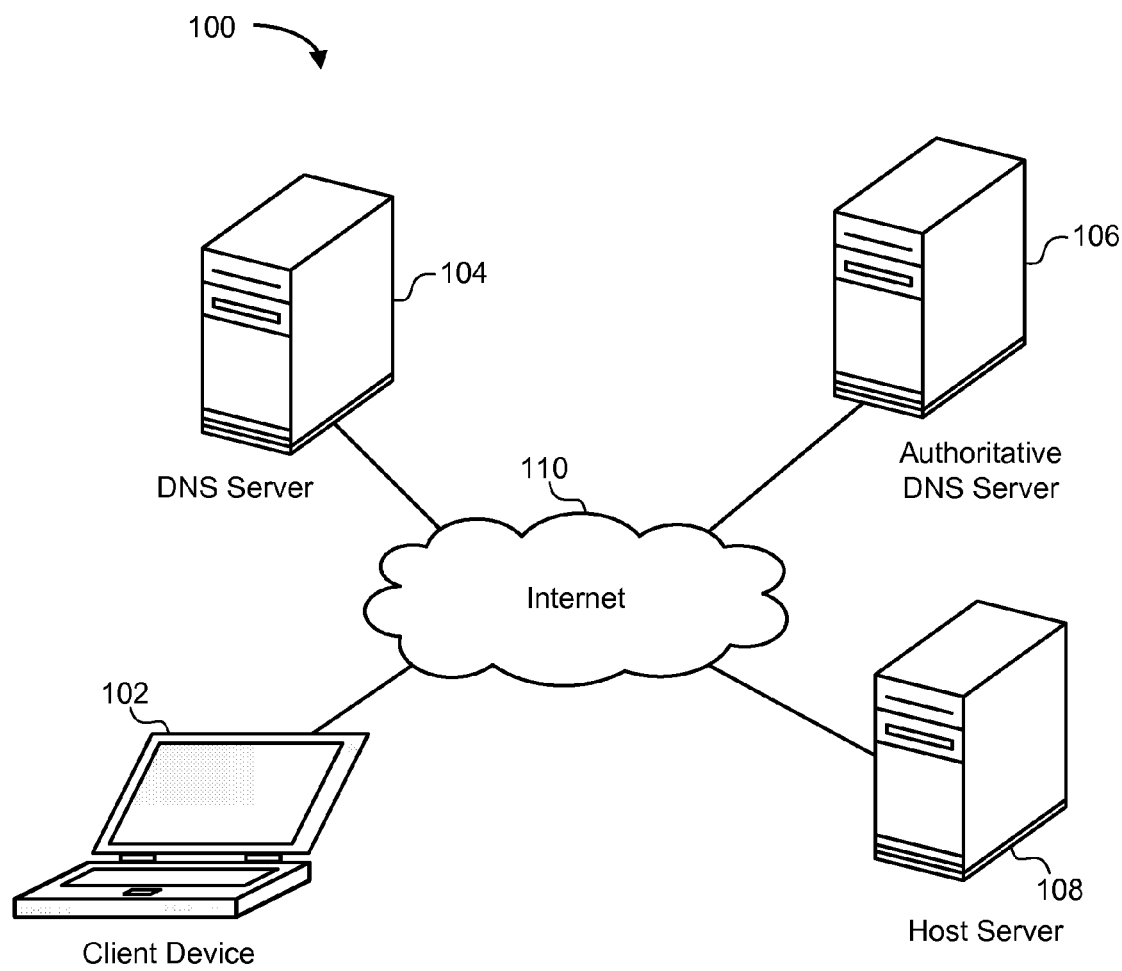
FIG. 1 depicts a schematic diagram of one embodiment of a communication system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments create a modified reverse DNS mapping that accurately correlates the domain hostname of a host server with a domain key that includes a combination of the destination IP address of the host server and the source IP address of the client device. In some embodiments, this reverse mapping is created on-the-fly during the initial forward mapping operations and stored on the DNS server for future reference. When a corresponding network packet with a destination IP address from the client device is received by an intermediate server, the intermediate server consults the reverse mapping in the DNS server to accurately determine the domain hostname associated with the destination IP address.

By way of comparison, conventional intermediate server operations are unable to obtain accurate hostname information without processing and reassembling each packet as it arrives from the client device. Since the intermediate server intercepts IP traffic, applies rules and filters, logs transactions, and routes the traffic based on business logic at the IP level (specifically understanding TCP/UDP packets but not tied to any higher level protocols), the intermediate server is unable to easily and reliably determine the domain hostname to which the packets are destined. This is because the domain hostname is used by the application layer, above the TCP/UDP layer. For a conventional intermediate server to obtain the domain hostname, the intermediate server reassembles the application protocol packets, correctly interprets them, and finds the domain hostname, which results in traffic delays and increased processing load, two factors which negatively impact customer satisfaction.

Thus, embodiments described herein facilitate obtaining the domain hostname without processing and reassembling the incoming packets. In particular, some embodiments of the intermediate server are able to readily access the destination IP address of every packet without substantial processing and reassembly. The destination IP address is then used, in conjunctions with the source IP address of the client device, by the intermediate server to obtain the reverse mapping from the corresponding DNS proxy process, without additional operations to contact an authoritative DNS server or other internet resource for the reverse mapping.

The ability to accurately obtain domain hostnames at the DNS server can provide many aspects of functionality. In some embodiments, an internet service provider (ISP) may want to configure the rules and filters of the intermediate server based on domain hostnames. As examples, the ISP may implement blocking known adult sites, restricting access to file sharing sites, and so forth. So accurately implementing the reverse mapping to obtain the actual domain hostnames used by the client device allows these rules to be applied correctly and to log client entries that match up to the actual domain hostnames contacted by the end subscriber.

In some embodiments, it may be possible to implement this reverse mapping after preliminarily searching a first packet header for an indication of the domain hostname. For example, the intermediate server may perform simple string searching of the first packet of a communication, in an attempt to find the domain hostname, for example, the HTTP 'host' header. However, this functionality may be unreliable, for example, if the host header is in a subsequent packet (other than the first packet) or a protocol other than HTTP is used. In the cases when the domain hostname cannot be found in the first packet, or according to some other threshold, the intermediate server implements reverse mapping as described herein through to determine the domain hostname, since the intermediate server can obtain the destination IP address of the host server 108 from the IP layer of the network packets received from the client device 102.

For convenience, the process of reverse mapping described herein, or portions thereof, also may be referred to as reverse aliasing. References within this description to reverse aliasing are understood as referred to corresponding operations related to the reverse mapping described herein. Additionally, at least some of the embodiments described herein rely on one or more of the following assumptions. In some embodiments, the DNS server (or other similar equipment) is configured so that for any request from the same client device 102, the forward lookup and reverse lookup are directed to the same DNS proxy process. In some embodiments, the DNS server (which acts as a forwarder to all of the DNS proxy processes) handles any extra traffic created by embodiments of the reverse aliasing described herein. In some embodiments, it is assumed that when a client device 102 creates a point-to-point protocol (PPP) session (and any parallel PPP session), the packets from the client are treated as coming from the same source IP address. In some embodiments, the source IP address for each client device 102 stays constant for the lifetime of the PPP session(s). In some embodiments, if the client device 102 ends a PPP session, the source IP address assigned to that client device 102 is quarantined for a period of time (e.g., 2 minutes reported). During that time, no other client device 102 is assigned that source IP address. However, if the same client device 102 re-connects within that period of time, the client device 102 is given the quarantined source IP address. In contrast, if the client device 102 does not reconnect within the quarantine period, the source IP address is made unavailable for a further period of time (e.g., 4 minutes reported). During this time, no other client device 102 can be assigned that source IP address. If the client device 102 reconnects shortly after the quarantine period (e.g., 3 minutes—1 minute past the quarantine period of 2 minutes), then the client device 102 is assigned a different source IP address (and as such could be routed to a different DNS proxy process and intermediate server on the DNS server). Other embodiments described herein may rely on similar or additional assumptions.

FIG. 1 depicts a schematic diagram of one embodiment of a communication system 100. The illustrated communication system 100 includes a client device 102, a DNS server 104, an authoritative DNS server 106, and a host server 108. Each of these component devices is coupled to each other via an intermediate network such as the internet 110. Although the communication system 100 is shown and described with certain components and functionality, other embodiments of the communication system 100 may include fewer or more components to implement less or more functionality.

In general, the client device 102 operates to access data (e.g., a website) on the host server 108. In order to facilitate this type of access, the client device 102 interfaces with the DNS server 104 to retrieve a destination IP address (e.g., 10.20.30.40) for the host server 108 based on a domain hostname (e.g., www.example.com). If the DNS server 104 does not have the forward mapping to correlate the destination IP address with the hostname supplied by the client device 102, then the DNS server 104 communicates with the authoritative DNS server 106 to obtain the corresponding forward DNS mapping. Upon obtaining the destination IP address for the host server 108, the client device 102 sends network packets to the host server 108 via the DNS server 104 (and any other intermediate network devices or nodes). Similarly, the host server 108 may send network packets back to the client device 102 via the same or a similar network path.

Figure 2:
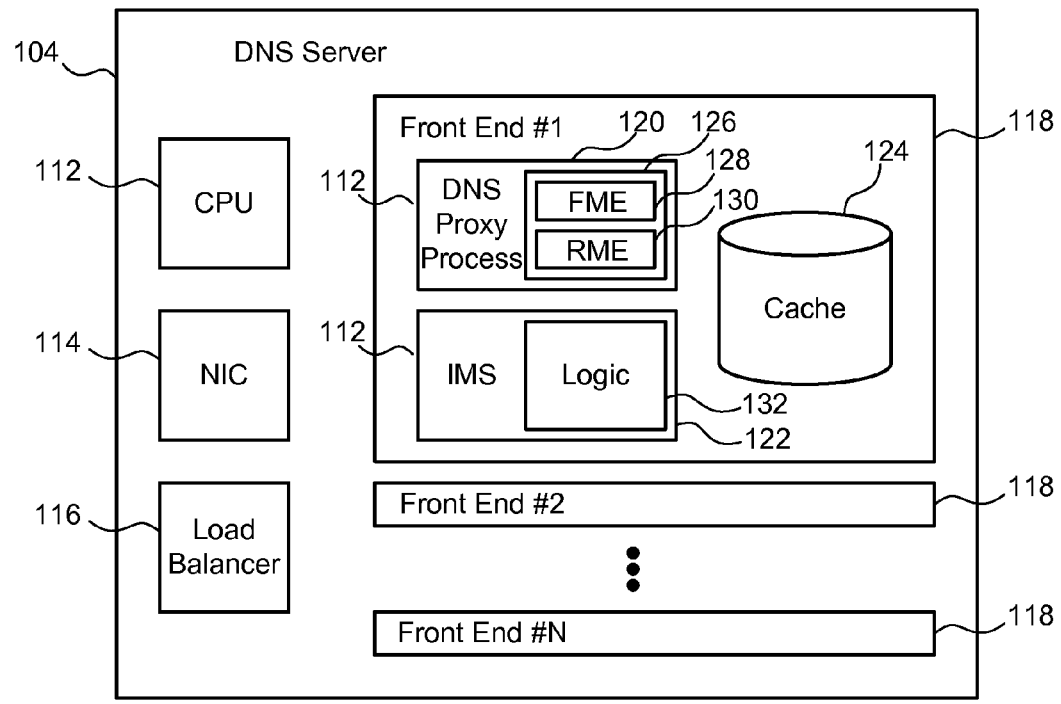
FIG. 2 depicts a schematic block diagram of one embodiment of the DNS server of the communication system of FIG. 1.

In one embodiment, the DNS server 104 implements a DNS proxy process (or simply DNS proxy) to process client requests for specific domains. One example of a DNS proxy process is shown in FIG. 2 and described in more detail below. For convenience, the DNS proxy process is described herein as using the Berkeley Internet Name Domain (BIND) protocol, although other protocols and/or specific implementations may be used in other embodiments. In some embodiments, the DNS proxy process uses modified BIND DNS operations and custom zone files that map a list of domains (i.e., hostnames) to IP addresses for forward mapping.

Figure 3:
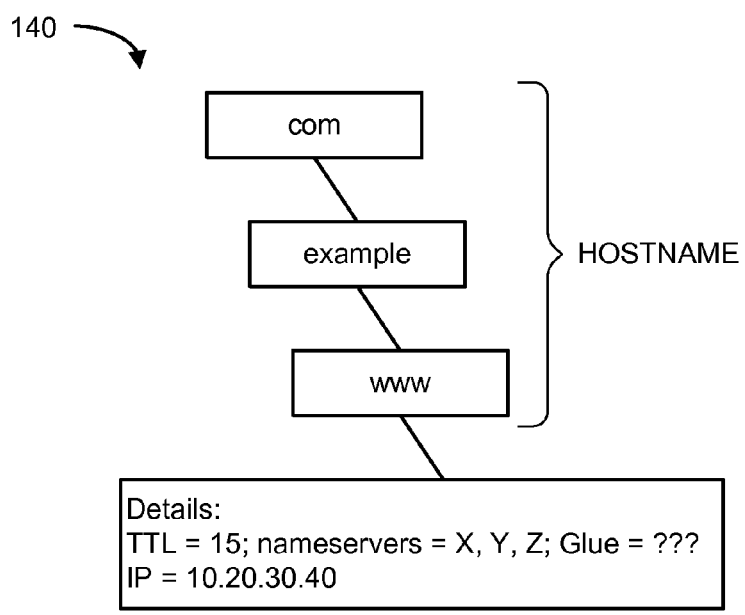
FIG. 3 depicts a diagram of one embodiment of a data structure for forward DNS mapping.
Figure 4:
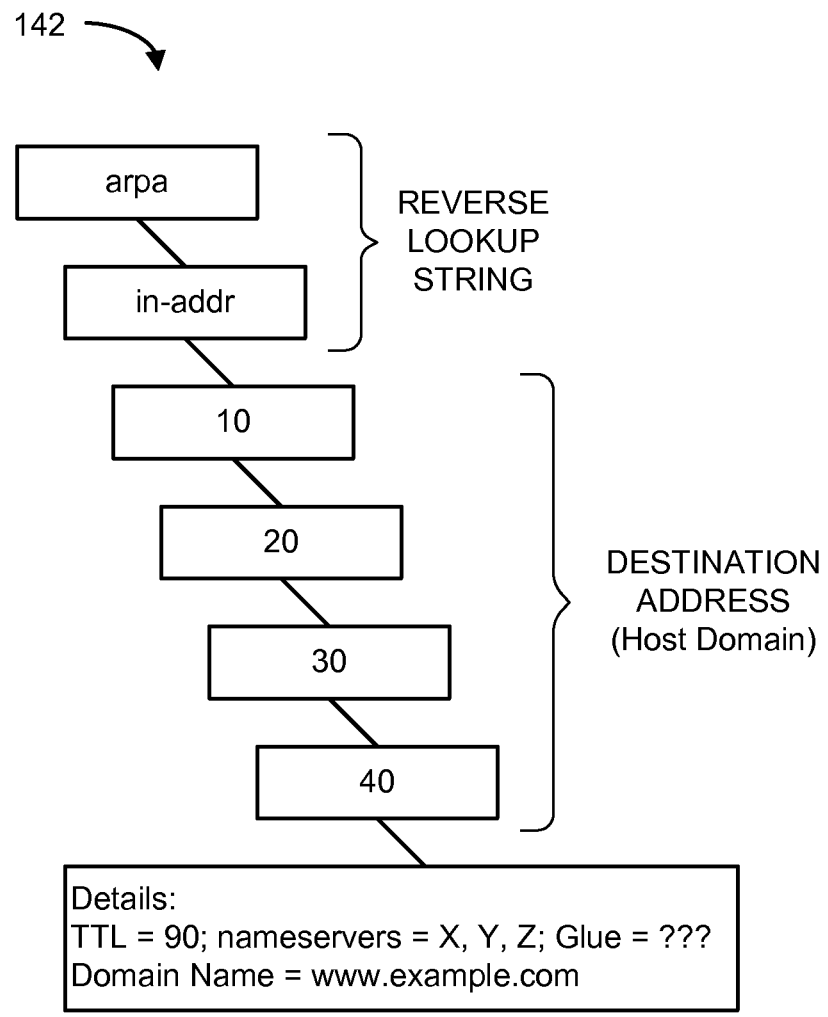
FIG. 4 depicts a diagram of one embodiment of a data structure for reverse DNS mapping.
Figure 5:
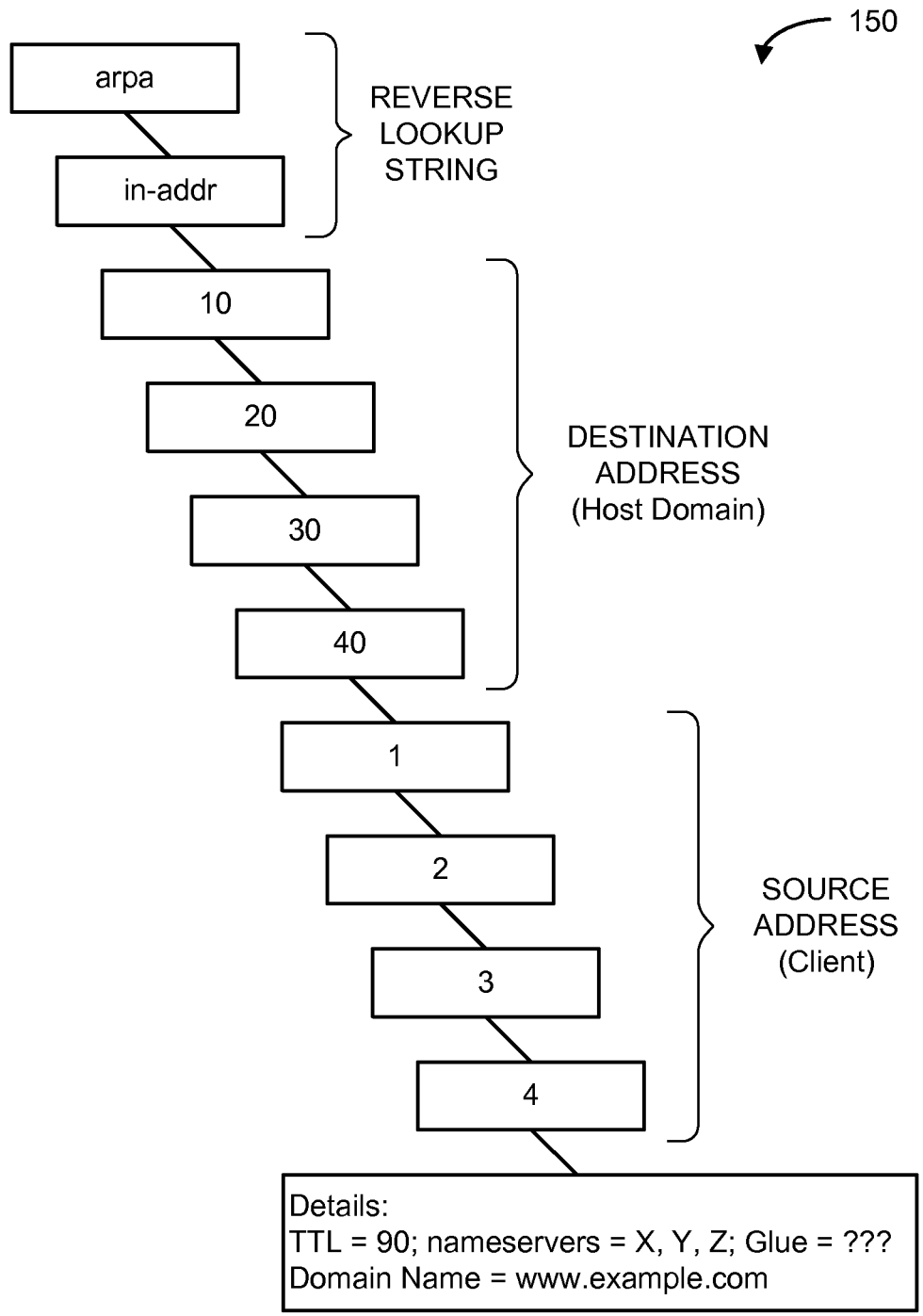
FIG. 5 depicts a diagram of another embodiment of a data structure for reverse DNS mapping based, at least in part, of a combination of a destination IP address of a host server and a source IP address of a client device.

In many embodiments, the DNS server 104 implements a local cache for each DNS proxy process (refer to FIG. 2). In some embodiments, the local cache is stored as a tree structure, with the domain key stored in reverse order. FIGS. 3-5, which are described in more detail below, illustrate various data structures that are compatible with a tree structure within the local cache.

FIG. 2 depicts a schematic block diagram of one embodiment of the DNS server 104 of the communication system 100 of FIG. 1. The illustrated DNS server 104 includes a central processing unit (CPU) 112, a network interface card (NIC) 114, a load balancer 116, and a plurality of front ends 118 (designated as #1, #2, ..., #N). As one example, an embodiment of the DNS server 104 includes up to 70 front ends, although other embodiments may have fewer or more front ends 118. Although the DNS server 104 is shown and described with certain components and functionality, other embodiments of the DNS server 104 may include fewer or more components to implement less or more functionality. For example, other embodiments of the DNS server 104 may include other standard peripheral devices, includes a display screen, input/output (I/O) devices and controllers, other networking components, communication busses, and so forth.

In general, the CPU 112 is implemented by one or more processors (i.e., cores) to execute instructions which implement the operations of the DNS server 104, including one or more sub-components within the DNS server 104. In some embodiments, execution of certain instructions transforms the CPU from general processing device (or computer) to a specific or special-purpose device (or computer). For example, the ability to execute the instructions described herein related to embodiments of the reverse mapping qualify the DNS server 104 as a special-purpose device (or special-purpose DNS server).

The NIC 114 facilitates network communications between the DNS server 104 and other devices connected to the DNS server 104, either directly or via the internet 110. Other embodiments of communication card or ports may be used within the DNS server in addition to or instead of the NIC 114.

The load balancer 116 operates to direct network traffic received by the DNS server 104 to the various front ends 118. In some embodiments, the load balancer 116 uses one or more algorithms to distribute the network packets among the various front ends 118. A specific implementation is described in more detail below, in which the load balancer 116 sends network packets from the client device 102 to the same front end 118 during the entire client session for that client device 102. Other embodiments of the load balancer 116 may implement other load balancing schemes.

In general, each front end 118 processes the network packets received from the load balancer 116. For clarity, only the front end #1 is shown in detail, although the other front ends #2-N may be similarly configured. The illustrated front end 118 includes a DNS proxy process 120, an intermediate server (IMS) 122, and a cache 124. Although the illustrated front end 118 includes both the DNS proxy process 120 and the intermediate server 122, in some embodiments the DNS proxy process 120 and the intermediate server 122 may be implemented in separate physical devices. Also, the cache 124 may be implemented as a single, physical device or, alternatively, as a logical portion of a larger, shared memory device. The schematic and hierarchical layout is not indicative of particular physical or logical separations or locations.

In one embodiment, the DNS proxy process 120 includes internal logic code 126 which implements a forward mapping engine (FME) 128 and a reverse mapping engine (RME) 130. The forward mapping engine 128 facilitates forward mapping operations to obtain a destination IP address based on a domain hostname (refer to FIG. 3). The reverse mapping engine 130 facilitates the reverse process—obtaining the domain hostname based on one or more IP addresses (refer to FIGS. 4 and 5).

In one embodiment, the intermediate server 122 includes internal logic code 132 which implements management operations. Some of the management operations include tracking hostnames that are requested by a particular client device 102.

In one embodiment, the cache 124 stores forward DNS mappings and reverse DNS mappings. When the client device 102 initiates a network communication intended for the host server 108 based on the hostname, the forward mapping engine 128 obtains the forward DNS mapping and stores the forward DNS mapping in the cache 124. The forward mapping engine 128 also returns the indicated destination IP address to the client device 102 for use in network communications with the host server 108. Additionally, the reverse mapping engine 130 creates a reverse DNS mapping and stores the reverse DNS mapping in the cache 124.

When network packets are received from the client device 102, in transit to the host server 108, the intermediate server 122 intercepts these network packets, extracts the destination IP address, and queries the DNS proxy process for corresponding domain hostname. The domain hostname is obtained using the reverse DNS mapping and returned to the intermediate server for tracking or other purposes.

FIG. 3 depicts a diagram of one embodiment of a data structure 140 for forward DNS mapping. The illustrated forward DNS mapping is fictitious for the domain hostname www.example.com. In order to implement forward DNS mapping, the forward mapping engine 128 creates a node for the top-level domain 'com' and for each sub-domain 'example' and 'www' as shown. These nodes are arranged in a tree structure which is coupled to details about the corresponding host server 108, including a time-to-live (TTL) parameter, nameservers, glue, and the destination IP address 10.20.30.40. The TTL parameter indicates how long the destination IP address is valid. The nameserver and glue parameters are typical parameters and, hence, are not described in more detail herein.

FIG. 4 depicts a diagram of one embodiment of a data structure 142 for reverse DNS mapping. The illustrated reverse DNS mapping is fictitious for the destination IP address 10.20.30.40. In order to implement reverse DNS mapping, the reverse mapping engine 130 creates nodes for a reverse lookup string, which may be customized to the version of IP that is used (e.g., IPv4). In the illustrated embodiment, the reverse lookup string is used to create an 'arpa' node and an 'in-addr' node. The reverse mapping engine 130 also creates nodes for each octet of the destination IP address '10.20.30.40.' These nodes are arranged in a tree structure which is coupled to details about the corresponding host server 108, including a TTL parameter for the reverse DNS mapping, nameservers, glue, and the corresponding domain hostname 'www.example.com.'

The illustrated combination of the destination IP address and the reverse search string is used as the domain key for conventional reverse DNS mapping. In particular, the destination IP address is reversed and has a 'in-addr.arpa' domain appended, so 10.20.30.40 will be converted into the domain name key '40.30.20.10.in-addr.arpa.' The details obtained from this reverse DNS mapping may be stored in the corresponding tree structure within the cache 124.

If the DNS server 104 had previously cached a mapping for the domain hostname 'www.example.com' and then received a reverse query for '40.30.20.10.in-addr.arpa,' then the DNS server 104 would attempt to find an 'arpa' node, then an 'in-addr' node, then '10', etc. If only the forward mapping (from diagram 1) exists, then the DNS server will not determine that it has a cache entry for '40.30.20.10.in-addr.arpa' and will issue a reverse DNS mapping request to the internet (i.e., to the authoritative DNS server 106 or another internet resource) to obtain the reverse DNS mapping.

However, there are many potential problems with using only the reverse search string and the reverse destination IP address as the domain key. For example, the domain name used in the original forward DNS mapping is not always the domain name returned by a subsequent reverse DNS mapping. DNS (as a specification) states that forward and reverse mappings are completely distinct. In practice, they are usually held in different authoritative DNS servers 106. The DNS specifications do not state that forward and reverse mappings need to mirror each other. In fact, there are a number of scenarios where the domain name used in a forward DNS mapping will not match the domain name returned by the subsequent reverse DNS mapping. As one example, a forward mapping for domain name X mapping to IP Y can be used without the corresponding reverse mapping for IP Y to domain name X existing. In this case, a forward lookup for X will return IP Y, but a reverse lookup for Y will return NXDomain (no domain exists). In another example, a forward mapping for domain name X mapped to IP Y can be used, while a reverse mapping of IP Y to domain name Z exists. This is a common case. In a further example, there can be multiple domain names (A, B, C) all mapped to IP Y. This can occur because DNS allows for multiple domain names to map to the same IP address (however the same is not true for reverse mappings, each IP address in the reverse mapping must be unique). In current examples of this on the internet, the reverse mapping can list any of the domains (A, B, C) as the reverse mapping, or another completely different domain. Hence, the conventional domain key shown in FIG. 4 may be inadequate in many situations.

FIG. 5 depicts a diagram of another embodiment of a data structure 150 for reverse DNS mapping based, at least in part, of a combination of a destination IP address of a host server 108 and a source IP address of a client device 102. The illustrated reverse DNS mapping is fictitious for the destination IP address 10.20.30.40 and the client IP address 1.2.3.4. In order to implement reverse DNS mapping, the reverse mapping engine 130 creates nodes for the octets of the client IP address, in addition to the nodes for the reverse lookup string and the destination IP address octets. In the depicted embodiment, these nodes are arranged in a tree structure which is coupled to details about the corresponding host server 108, including a TTL parameter for the reverse DNS mapping, nameservers, glue, and the corresponding domain hostname 'www.example.com.'

Figure 6:
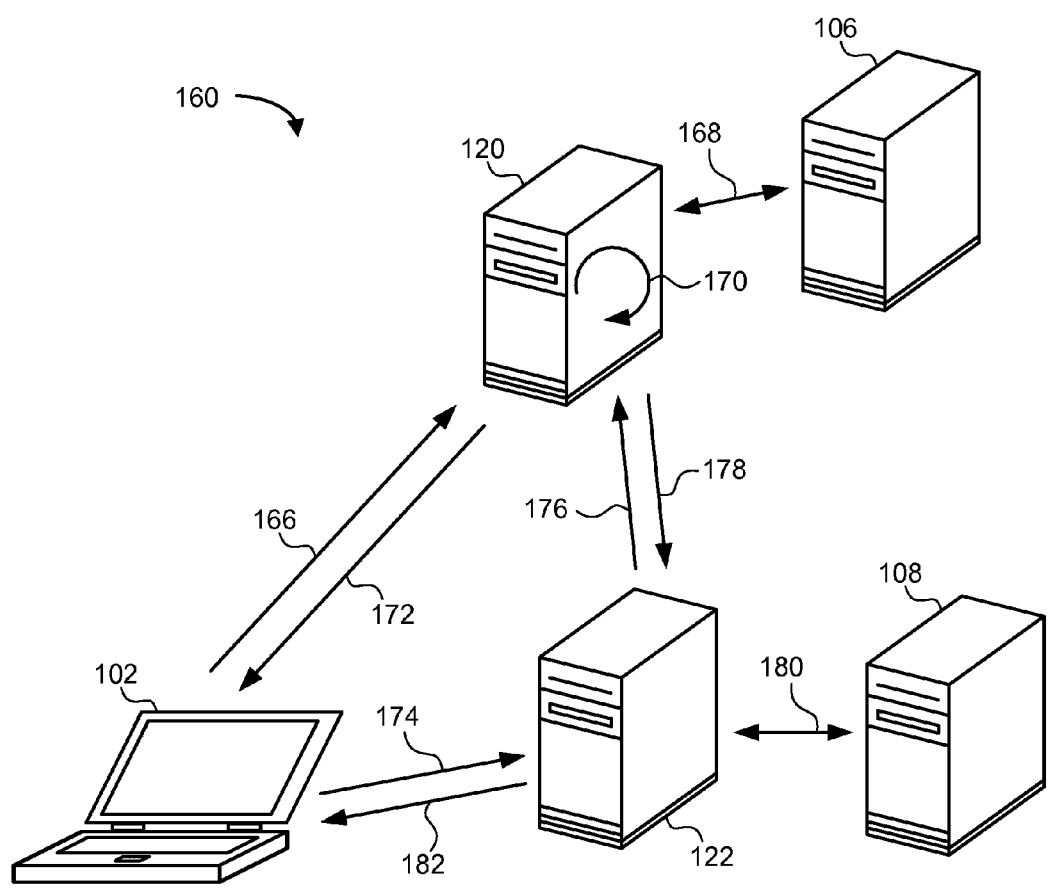
FIG. 6 depicts a process flow diagram of one embodiment of a method for implementing reverse DNS mapping.

FIG. 6 depicts a process flow diagram of one embodiment of a method 160 for implementing reverse DNS mapping. The illustrated method 160 uses many of the components described previously, including the client device 102, the DNS proxy process 120, the intermediate server 122, the authoritative DNS server 106, and the host server 108. For reference, the fictitious source IP address for the client device 102 is 1.2.3.4, and the fictitious destination IP address for the host server 108 is 10.20.30.40. Also, the fictitious domain hostname of the host server 108 is www.example.com. Additionally, although the method 160 is essentially described in conjunction with the communication system 100 of FIG. 1, embodiments of the method 160 may be implemented with other types of communication systems.

At arrow 166, the client device 102 makes a forward lookup for the destination IP address for www.example.com. Upon receiving the forward lookup query at the DNS proxy process 120, the DNS proxy process 120 checks the corresponding cache 124. If the forward DNS mapping is not located in the cache 124, then at arrow 168 the DNS proxy process 120 retrieves the forward DNS mapping from the authoritative DNS server 106 via the internet 110. The DNS proxy process 120 then stores, at arrow 170, the forward DNS mapping (with the forward TTL parameter) in the cache 124. The DNS proxy process 120 also stores the corresponding reverse DNS mapping in the cache 124. This reverse DNS mapping operation is performed on-the-fly during the forward mapping query operations. As explained herein, the reverse DNS mapping includes a domain key that relies on the combination of the destination IP address of the host server 108 and the source IP address of the client device 102. At arrow 172, the DNS proxy process 120 returns the destination IP address for the host server 108 to the client device 102.

The client device 102 then uses, at arrow 174, the destination IP address in network request packets (using any suitable protocol) directed to the host server 108 via the intermediate server 122. The intermediate server 122 intercepts these network packets and attempts to retrieve the domain hostname directly from the packets, without substantial processing and reassembly. If the intermediate server 122 is unable to retrieve the domain hostname in this manner, then the intermediate server 122 combines the destination IP address for the host server 108 and the source client IP address for the client device 102 to create a domain key for reverse DNS mapping. At arrow 176, the intermediate server 122 sends a reverse mapping query with the domain key to the DNS proxy process 120. The DNS proxy process 120 retrieves the reverse DNS mapping from the cache 124 and, at arrow 178, sends the indicated domain hostname to the intermediate server 122, which may use the domain hostname for tracking or other purposes. The intermediate server then facilitates the communications between the client device 102 and the host server 108 at arrows 180 and 182.

Figure 7:
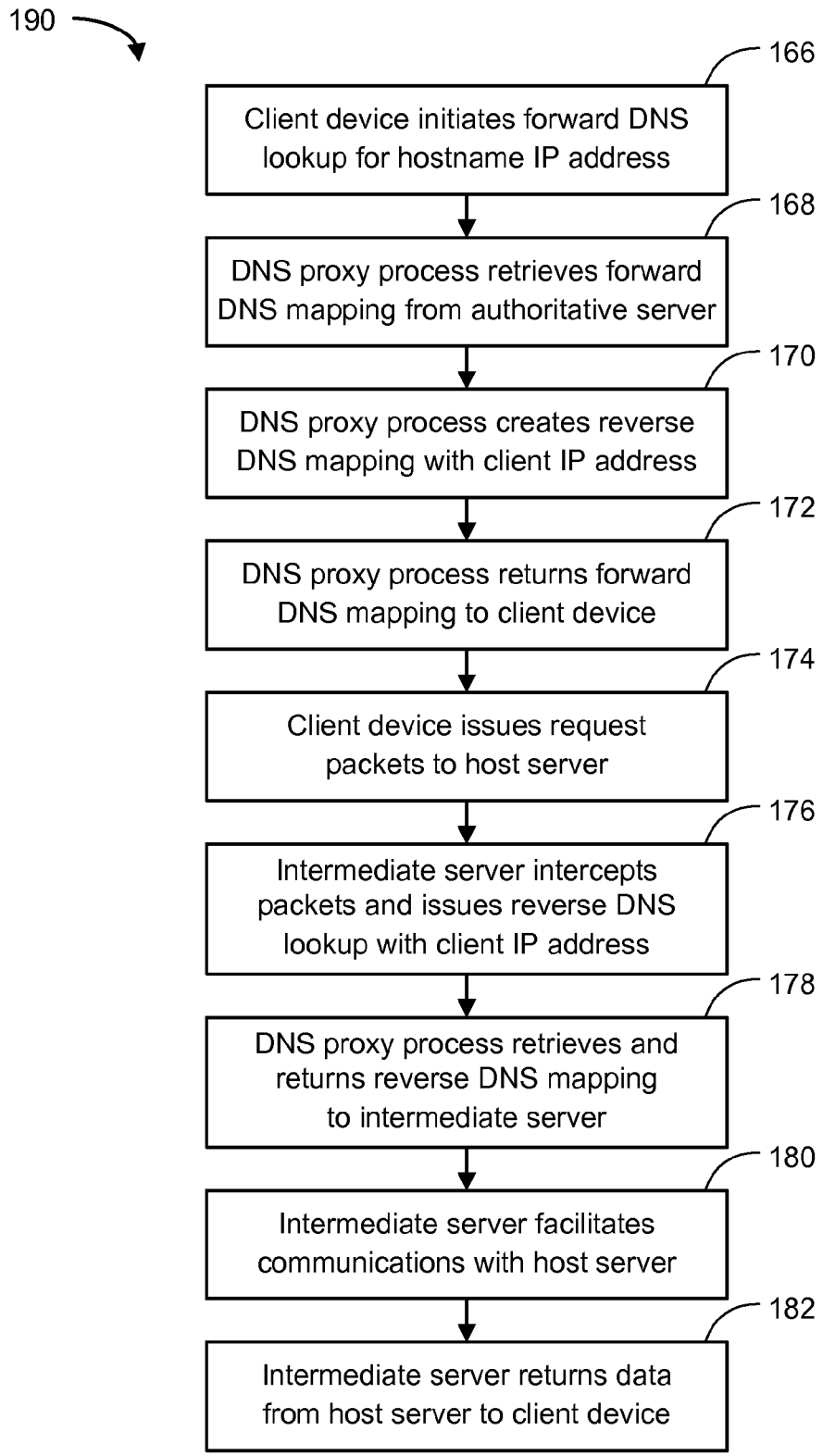
FIG. 7 depicts a flow chart diagram of the method for implementing reverse DNS mapping shown in the process flow diagram of FIG. 6.

FIG. 7 depicts a flow chart diagram of the method 160 for implementing reverse DNS mapping shown in the process flow diagram of FIG. 6. The method operations shown in the method 160 of FIG. 7 are substantially similar to the method operations designated by the same reference numerals in FIG. 6 and described above.

Figure 8:
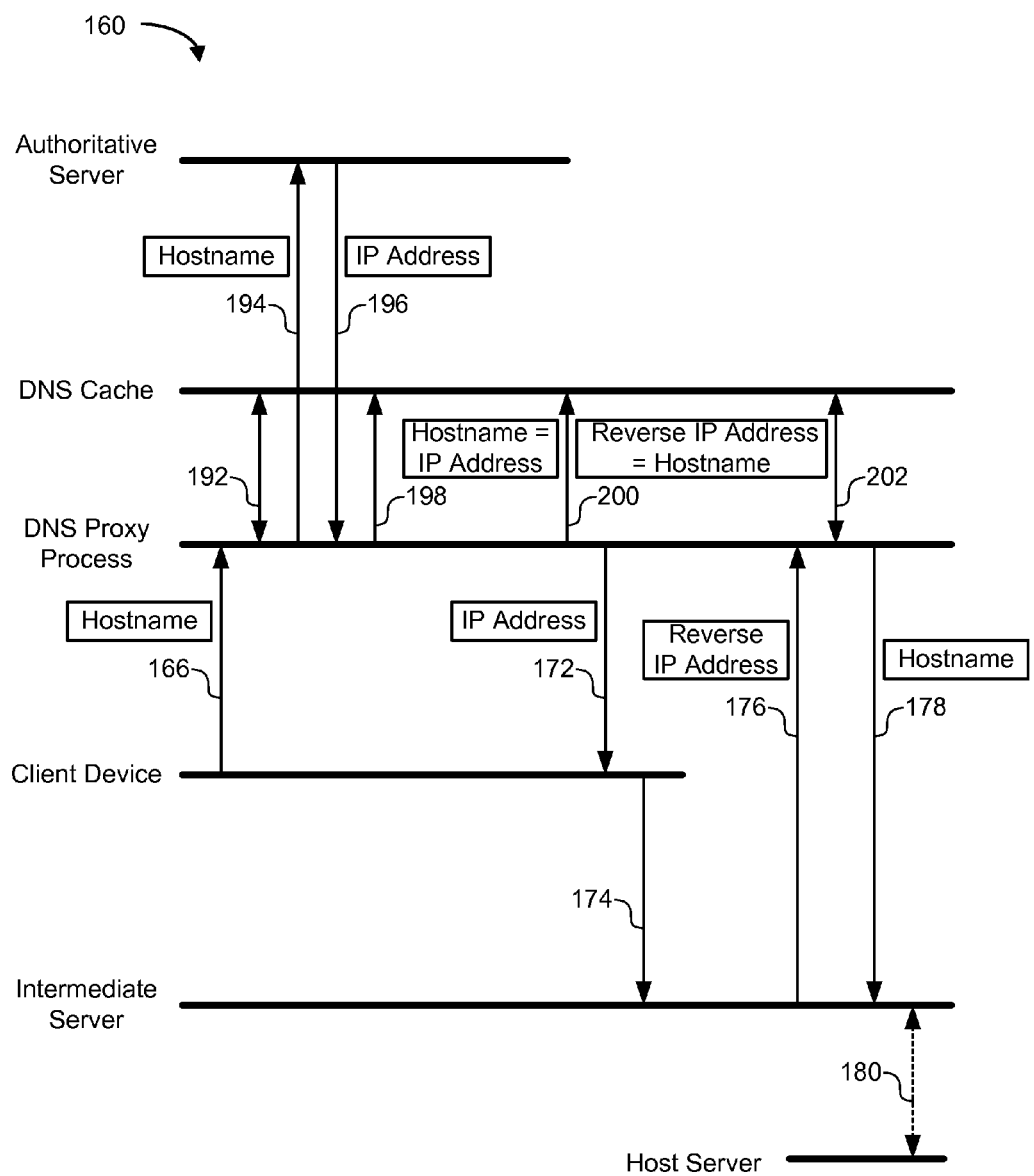
FIG. 8 depicts another process flow diagram of the method for implementing reverse DNS mapping.

FIG. 8 depicts another process flow diagram of the method 160 for implementing reverse DNS mapping as shown in the process flow diagram of FIG. 6. The method operations shown in the method 160 of FIG. 8 are substantially similar to the method operations designated by the same reference numerals in FIG. 6 and described above.

Additionally, FIG. 8 includes some method operations that are not specifically shown in the previous FIGS. 6 and 7. In particular, FIG. 8 shows an operation 192 in which the DNS proxy process 120 checks the cache 124 to determine if the forward DNS mapping is already available in the cache 124. If the forward DNS mapping is not available in the local cache 124, then the DNS proxy process 120 sends the domain hostname to the authoritative DNS server 106 at arrow 194, which returns the corresponding destination IP address at arrow 196. Arrows 198 and 200 illustrate the specific operations corresponding to the arrow 170 of FIG. 6, in which the DNS proxy process 120 stores the forward and reverse DNS mappings in the local cache 124. Lastly, FIG. 8 specifically shows operation 202 in which the DNS proxy process 120 retrieves the reverse DNS mapping from the cache in response to the reverse mapping query from the intermediate server 122. The remaining operations are illustrated in the previous FIGS. 6 and 7.

Similar operations to those described for FIGS. 6-8 can be used for situations in which client devices 102 use the same front end to access virtual domains having the same destination IP address. Since the client devices 102 have different source IP addresses, and the source IP addresses are used in the reverse DNS mapping, the usage of the same destination IP address for both of the virtual domains does not prevent the intermediate server 122 from tracking which client device 102 accessed each of the virtual domains. As an example, the reverse DNS mapping for on client device 102 (with source IP address 1.2.3.4) might include the domain key 4.3.2.1.40.30.20.10.in-addr.arpa, while the reverse DNS mapping for the other client device 102 (with source IP address 5.6.7.8) might include the domain key 8.7.6.5.40.30.20.10.in-addr.arpa. Thus, the inclusion of the source IP address of the each client device 120 may be sufficient to distinguish between reverse DNS mappings that otherwise have the same destination IP address and are stored in the same cache.

Figure 9:
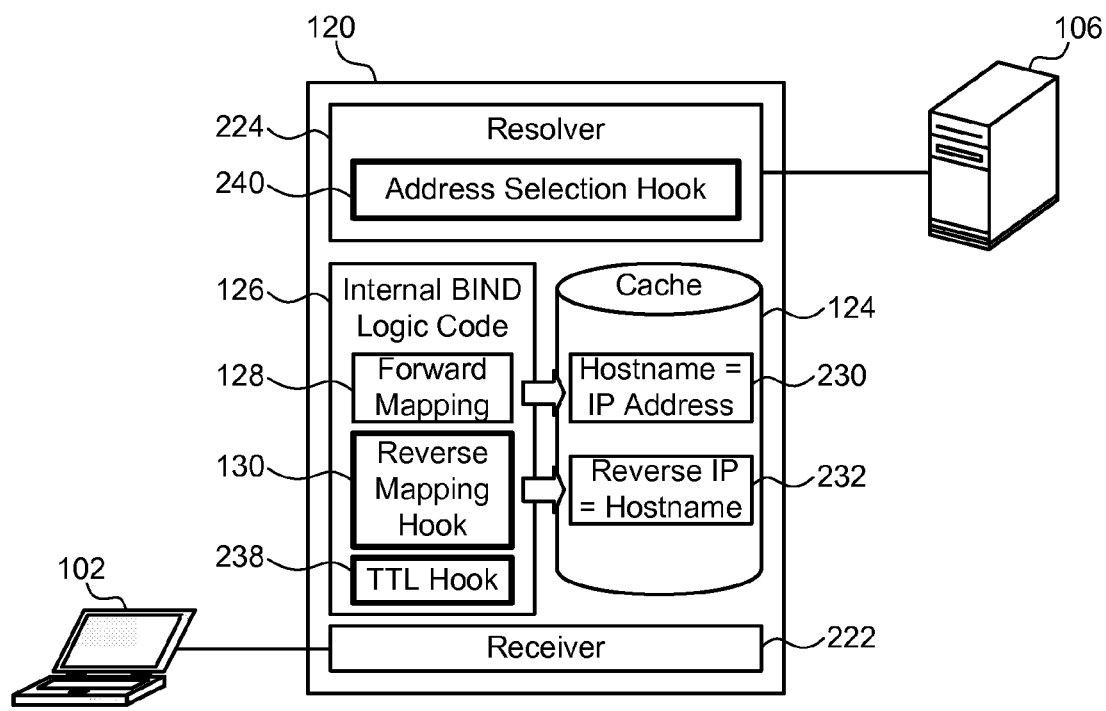
FIG. 9 depicts a schematic block diagram of one embodiment of the DNS proxy process of FIG. 2.

FIG. 9 depicts a schematic block diagram of one embodiment of the DNS proxy process 120 of FIG. 2. For reference, the DNS proxy process 120 is shown relative to the client device 102 and the authoritative DNS server 106. The illustrated DNS proxy process 120 includes a receiver 222, the internal logic code 126 with the forward mapping engine 128 and the reverse mapping engine 130 (implemented as a hook). The DNS proxy process 120 also includes the cache 124 and a resolver 224.

In general, the receiver 222 facilitates communications with the client device 102 and, in particular, receives the forward DNS lookup from the client device 102. The internal logic code 126 and, in particular, the forward mapping engine 128 interfaces with the resolver 224 to retrieve the forward DNS mapping from the authoritative server 106 (if it is not already in the cache 124).

Since the resolver 224 may receive more than on destination IP address corresponding to the domain hostname, the resolver 224 includes an address selection hook 240 which discards all but one of the destination IP addresses. The forward mapping engine 128 then stores the forward DNS mapping 230 in the cache 124 for future reference. The reverse mapping engine 130 (implemented in some embodiments as a reverse mapping hook) also creates and stores a corresponding reverse DNS mapping 232 in the cache 124. The forward mapping engine 128 then sends out the forward DNS mapping to the client device 102 with a TTL parameter that is specified according to the TTL hook 238.

The address selection hook 240 is described in more detail. In one embodiment, the address selection hook 240 is placed in the internal logic code 126 at the point where a response from the forwarder is received. This address selection hook 240 checks if the response is for an IPv4 forward query. If it is, then the address selection code removes all but the first 'A' mapping. Other embodiments may use a different mapping. Also, in some embodiments, the address selection hook 240 leaves any 'CNAME' entries in the response, as they will point to the 'A' records contained. Also, in some embodiments, the address selection hook 240 does not modify other elements of the response, including the authority or additional section.

The reverse mapping hook 130 is described in more detail. The reverse mapping hook 130 is placed in the internal logic code 126 after the response mapping has been stored to or retrieved from cache 124. The reverse mapping hook will hold up the current response and create a new 'on-the-fly' reverse mapping, as described above. In some embodiments, the reverse mapping sets the domain key in the following format: <reverse of client source IP address>"."<reverse of current response IP address>"."in-addr.arpa." So if the source IP address is 1.2.3.4 and the current response IP address is 10.20.30.40, the resulting domain key is: "4.3.2.1.40.30.20.10.in-addr.arpa."

In some embodiments, the 'on-the-fly' reverse mapping is created for all forward mapping queries received by the DNS proxy process 120. In some embodiments, the domain name value in the 'on-the-fly' reverse mapping is the domain name from the original query. In some embodiments, the TTL for the cached 'on-the-fly' reverse mapping is the value of a configuration parameter 'reverse-alias-ttl.' In some embodiments, the mapping type for the reverse mapping is "PTR."

In some embodiments, the 'on-the-fly' reverse mapping does not contain any authority or additional section. Once this reverse mapping is created, the reverse mapping is stored in the cache 124. If an existing reverse mapping (with the same domain key) already exists, this mapping is overwritten. Also, in some embodiments, the 'on-the-fly' reverse mapping is garbage collected from the DNS server cache 124 as any other cached mapping. In some embodiments, the reverse mapping hook will simply re-use the existing BIND code that normally stores reverse mappings, using the newly created 'on-the-fly' reverse mapping structure.

The TTL hook 130 is described in more detail. In some embodiments, the TTL is placed in the internal logic code 126 when responses are about to be sent back to the client device 102. The TTL hook determines if the current response is for an IPv4 forward query. If it is then the hook will modify the TTL of the response. In some embodiments, the TTL value used to replace the current responses TTL will be the value of a configuration parameter 'response-ttl.'

When the subsequent reverse lookup query (for "4.3.2.1.40.30.20.10.in-addr.arpa") is received from the intermediate server 122, the existing internal logic code 126 will automatically be able to find that mapping in the cache 124 and return the domain name existing in that mapping. However, if some issue occurs where the 'on-the-fly' reverse mapping does not exist (e.g., if the client device 102 followed a URL with an IP address instead of the domain name, like http://10.20.30.40/cgi-bin/hello.cgi), then the standard internal logic code would search the internet for that mapping or, alternatively, immediately return NXDomain (no domain found), as described in more detail below.

Thus, it can be seen that embodiments described herein present a number of modifications to conventional DNS proxy processes and/or intermediate servers. These modification include reverse alias (reverse mapping) 'on-the-fly' cache injection in the DNS proxy process. Changes may be made to conventional BIND code to allow the 'on-the-fly' reverse mapping to be created. These changes provide the overall requirement of adding the 'on-the-fly' reverse mapping for all forward (IPv4) queries, and allowing any reverse query (e.g., from the intermediate server 122) to match.

In one embodiment, the reverse alias functionality performs the following operations. Note that the reverse aliasing functionality does not necessarily involve any code changes on the request path through the DNS proxy process 120. When the DNS proxy process 120 receives a mapping response from the forwarder, and it is an IPv4 forward mapping response and the answer section contains multiple 'A' records to multiple IP addresses, then the DNS proxy process 120 removes all but the first 'A' mapping, leaving only a single destination IP address in the response. In some embodiments, this happens before the response is cached.

After the response is cached, but before any response is sent back to the client device 102, the internal logic code 126 'on-the-fly' creates a brand new reverse DNS mapping structure inside the DNS proxy process memory, and it stores the new reverse mapping in the cache 124. In some embodiments, the 'on-the-fly' reverse mapping is constructed from the domain key, the domain hostname, and the reverse TTL parameter. The domain key may be a concatenation of the reverse of the client source IP address (if source IP was 1.2.3.4, this value will be 4.3.2.1); the reverse of the destination IP address in the answer section from the response (if the IP address was 10.20.30.40, this value will be 40.30.20.10); and the string "in-addr.arpa" making it a reverse lookup. This would make the domain key value '4.3.2.1.40.30.20.10.in-addr.arpa.' In some embodiments, neither authority section nor additional section is added for the newly cached reverse mapping. In some embodiments, when the response (to the original query) is about to be returned to the client, the TTL of that response is changed to be the value of the 'response-ttl' configuration parameter.

Another modification includes a reverse alias application program interface (API) library. In one embodiment, the intermediate server 122, as a client of the DNSProxy, has the ability to send a reverse mapping query of the form described above, adding the reversed source IP address to the reversed destination IP address. Normal Open Group or Solaris commands (such as gethostbyaddr or getaddrinfo) do not provide the ability to pass more than 4 octets in the query, but embodiments described herein may use more than 4 octets. In one example, the embodiments described herein use 8 octets in the reverse mapping queries.

In one embodiment, the open source UNIX code for the gethostbyaddr or getaddrinfo can be rewritten to allow 8 octets to be handled. This new implementation of the gethostbyaddr or getaddrinfo function can then be loaded as a shared or static library into the intermediate server to allow reverse alias queries to the DNS proxy process 120.

In some embodiments, there may be enhancements which covered the BIND code behavior if an 8 octet reverse alias query is received by the BIND code but for which the mapping is not in the cache. In this case, the default BIND code may simply forward the request to the forwarder (which would likely never have such an 8 octet mapping and would query the internet for the mapping). This approach may conserve network or computer time searching the internet for mappings that could (and should) never exist. Rather than contact the forwarder if the reverse alias mapping is not cached, the BIND code may immediately return an NXDomain response.

To implement this enhancement, the BIND code may have a hook placed after the cache has been searched for any 8 octet reverse mapping query. If the mapping was not in cache, the BIND code prevents the query passing to the forwarder, and instead returns an NXDomain response to the client. In some embodiments, this hook saves processing time, as this 'on-the-fly' style reverse domain key is unlikely to exist on the internet. Note that it is expected that this will be such an infrequent occurrence and will only be invoked during the failover scenario. Care may be taken so as to ensure Classless Inter Domain Routing functionality it not broken.

In some embodiments, this hook is the only BIND code change implemented to handle subsequent reverse lookups (of the combined source IP and destination IP form) from the intermediate server 122. If the reverse mapping queried from the intermediate server does not exist in the BIND cache, this hook causes an NXDomain response to be returned. There is new code implemented for the intermediate server to allow it to make such a reverse mapping query.

There are also several potential problems that can be addressed by embodiments described herein. A first problem relates to DNS requests which can be sent to different DNS servers. In particular, a typical client device like a phone or a laptop can be configured to contact two (sometimes more) DNS servers to request mappings.

The DNS proxy process 120 stores its cached mappings in memory, which means each process instance of the DNS proxy process 120 will maintain its own cache, separate from other BIND process instances. As the BIND processes are held on separate servers, no sharing is done on the cached mappings, hence a mapping cached in BIND server #1, will not be accessible on BIND server #8. Any pre-caching done by BIND server #1 can only be performed on its own memory.

In this situation, a client device 102 can make a forward DNS query, which the load balancer 116 routes to BIND server #1, and any cache forward mapping will be stored in the memory of BIND server #1. Also, the pre-cache reverse mapping is stored in BIND server #1. When the client device 102 subsequently makes its request through the intermediate server 122, the intermediate server issues the reverse query which could be load balanced to BIND server #8, and so the pre-cache reverse mapping is not found and the correct domain may not be returned.

As a solution to this problem, the ISP can agree to implement a network architecture whereby all network requests coming from a certain source IP address (i.e. during a client devices PPP session) will all be routed to the same front end. Each front end will have both an intermediate server and DNS proxy process installation, and can therefore handle all of the client devices requests. Each intermediate server will be configured to query the DNS proxy process for any reverse mappings.

This then gives us the scenario where a client device doing a forward lookup will automatically be routed to front end #18 (for example), the BIND server #18 will handle the request and pre-cache the corresponding reverse mapping. Then when the client device issues any TCP/IP packets to the destination those packets will also be routed to front end #18, where the intermediate server #18 will intercept the packets, and make a reverse query to localhost/BIND server #18 which already has the pre-cache mapping.

A second potential problem relates to multiple domain names can map to a single IP address. In particular, as virtual domains are popular on the internet, where a hosting company hosts multiple web sites (each with unique domain names) of the same IP address, it could be possible that multiple client devices routed to the same front end could be concurrently accessing different domain names which all map to the same IP address. As any cached reverse mapping is key'ed on the IP address, each client devices 'on-the-fly' reverse mapping would be interfering with the others.

For example, three clients A, B & C are all routed through front end #18, and three domains www.apple.com, www.orange.com & www.peach.com are all virtually hosted on the same IP address 10.20.30.40. When device A requests a forward mapping for www.apple.com, the BIND server #18 will pre-cache 10.20.30.40=www.apple.com. At the same time, device B could be requesting a forward mapping for www.orange.com which again will require the BIND server #18 to pre-cache 10.20.30.40=www.orange.com. Device C could also be looking at www.peach.com. Thus, the pre-cached reverse mapping for 10.20.30.40 will constantly get overwritten and would cause race conditions meaning that by the time the intermediate server issues a reverse query to BIND server #18, the wrong domain name could be returned.

As a solution to this problem, the pre-cache reverse mapping can be extended. Normally the key for the reverse mapping would be '40.30.20.10.in-addr.arpa', but BIND allows more than 4 octets to be used in the reverse mapping name. Each client device will be coming from a different source IP address, so this source IP address is appended to or otherwise combined with the pre-cache reverse mapping, in order to distinguish between devices A, B & C's request, and report the correct domain name to the intermediate server.

When the forward mapping is handled by the BIND server, for 'www.apple.com' to 10.20.30.40, the BIND server will use the mapped IP address (10.20.30.40) and append the client devices IP address (1.2.3.4) to create a pre-cache mapping key of '4.3.2.1.40.30.20.10.in-addr.arpa' to 'www.apple.com'. When the client device subsequently contacts the intermediate server, the intermediate server will also be able to append the devices source IP address to its reverse query, thereby asking for '4.3.2.1.40.30.20.10.in-addr.arpa', which can only match 'www.apple.com' and not the 'www.orange.com' or 'www.peach.com' currently used by devices B & C as their source IP address is different.

A third potential problem relates to multiple (CNAME) IP addresses can be returned. In particular, the forward query for a domain hostname can return multiple 'A' records. Normally, this is a form of load balancing performed by the authoritative DNS server. The de-facto standard is to simply use the first IP address listed, and the other IP addresses will be idle. To spread this load the authoritative DNS server can cycle the order of the IP addresses to spread general internet traffic going to the indicated web site. After a certain time period, the authoritative DNS server will move the current IP address to the bottom of the list, meaning all clients requesting a new mapping for the indicated website would now get the next IP address as the first IP in the list and the would use that address.

For the reverse alias implementations, this may present a problem. As a solution to this problem, when a DNS proxy process 120 starts, its cache 124 is empty. The cache 124 is populated each time a mapping request comes into the DNS proxy process 120 that it does not know, and that it obtains from the internet (or from a pre-cache reverse mapping in this functionality). So if a device requested a specific domain hostname, the DNS proxy process 120 would go out to the internet and obtain this mapping. The DNS proxy process 120 would then cache the mappings and return the data to the client.

To prevent the DNS proxy process 120 from filling up its cache with (potentially) multiple reverse mappings for the same domain hostname, the DNS proxy process 120 server will remove all but the first IP address from the mapping. In this way, only one reverse mapping needs to be pre-cached, while at the same time only one IP address is returned to the client device. So any devices that can use an IP other than the first will only receive the first and cannot slip through the reverse alias net.

A fourth potential problem relates to client devices that can maintain their own DNS cache. In fact, this issue can cause at least three separate problems. Note that some client devices do not have their own DNS cache (they issue forward queries for every request) and some client devices have a full DNS cache (e.g. laptops).

Without going into detail on each of these problems, it should be sufficient to state that one solution for these problems includes essentially taking any client device cache out of the equation by modifying the TTL of all forward DNS mapping responses to be 0 seconds. This means that when a client device stores the forward mapping for a specific domain hostname in its cache, it will immediately expire. Consequently, any future accesses to the same domain hostname will require a new forward mapping query. In the case where multiple domain names are mapped to the same IP address, setting the response TTL to 0 means all accesses to each domain hostname will require a forward mapping request, and that forward mapping request will continually re-populate the pre-cached reverse mapping to be the correct domain name for this current request.

There may also be some limitations to certain embodiments of reverse aliasing described herein. As one possible limitation, the number of cache mappings will potentially increase. As another possible limitation, the number of DNS mapping queries on the customer network will potentially increase due to the constraints on the TTLs returned to the client devices. As another possible limitation, the 'response-ttl' is set to 0 seconds, requiring that each access to a domain hostname will consume resources for a specific forward mapping query.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations for IP address mapping. In one embodiment, the operations include obtaining a destination internet protocol (IP) address for a host server based on a corresponding hostname received from a client device. The operations also include storing a forward mapping in a local cache. The operations also include storing a reverse mapping in the local cache. Other embodiments include other operations, as described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A domain name system (DNS) server comprising:
    a receiver to receive a hostname from a client device, wherein the hostname corresponds to a host server;
    a forward mapping engine to obtain a destination internet protocol (IP) address for the host server based on the hostname received from the client device;
    a reverse mapping engine to store a reverse mapping in a local cache, wherein the reverse mapping defines a correlation between:
        the hostname; and
        a combination of the destination IP address for the host server and a source IP address for the client device; and
    wherein the DNS server is configured to:
        process a reverse mapping query to obtain the hostname of the host server, wherein the reverse mapping query comprises the source IP address of the client device in combination with the destination IP address of the host server; and
        obtain the hostname of the host server in response to the reverse mapping query.

2. The DNS server of claim 1, wherein the reverse mapping engine is further configured to store the reverse mapping in the local cache after obtaining the destination IP address and before sending the destination IP address to the client device.

3. The DNS server of claim 1, wherein the reverse mapping engine is implemented within internal logic code, and the internal logic code comprises a reverse mapping hook to trigger storing the reverse mapping in the local cache during forward mapping operations between the client device and the DNS server.

4. The DNS server of claim 3, wherein the internal logic code further comprises an address selection hook to trigger selection of a single destination IP address in response to retrieving multiple destination IP addresses corresponding to the hostname of the host server, wherein the address selection hook triggers discarding all of the destination IP addresses except for the selected destination IP address.

5. The DNS server of claim 3, wherein the internal logic code further comprises a time-to-live (TTL) hook to set a TTL parameter to zero, wherein the TTL parameter is indicative of a time during which the forward mapping is considered valid.

6. The DNS server of claim 3, wherein the internal logic code further comprises a NXDomain hook to forego contacting an authoritative DNS server to perform a reverse mapping operation based on the combination of the destination IP address for the host server and the source IP address for the client device in response to a determination that the reverse mapping for the combination of the destination IP address for the host server and the source IP address for the client device is not located in the local cache.

7. The DNS server of claim 1, further comprising:
    a plurality of front ends, wherein each front end comprises:
        a DNS proxy process; and
        a proxy cache; and
    a load balancer coupled to each of the plurality of front ends, wherein the load balancer is configured to send all network requests from the source IP address for the client device to the same front end throughout a client session for the client device.

8. The DNS server of claim 7, wherein each front end further comprises an intermediate server (IMS) to communicate with the corresponding DNS proxy process, wherein the intermediate server is configured to send a reverse mapping query to the corresponding DNS proxy process to obtain the hostname of the host server in response to receiving a packet from the client device directed to the destination IP address of the host server.

9. The DNS server of claim 1, wherein the reverse mapping engine is further configured to store the following as part of the reverse mapping:
    a domain key comprising the combination of the destination and source IP addresses;
    the hostname of the host server; and
    a time-to-live (TTL) parameter indicative of a time during which the reverse mapping is considered valid.

10. The DNS server of claim 9, wherein the domain key comprises a concatenation of the following:
    the source IP address, in reverse order, for the client device;
    the destination IP address, in reverse order, for the host server; and
    a reverse lookup string.

11. A domain name system (DNS) proxy process comprising:
    internal logic code stored on a computer readable storage device, the internal logic code comprising instructions to perform operations, when executed on a computer, for IP address mapping, wherein the operations comprise:
        obtaining a destination internet protocol (IP) address for a host server based on a corresponding hostname received from a client device;
        storing a forward mapping in a local cache, wherein the forward mapping defines a correlation between:
            the destination IP address for the host server; and
            the hostname;

storing a reverse mapping in the local cache, wherein the reverse mapping defines a correlation between:
: the hostname; and
: a combination of the destination IP address for the host server and a source IP address for the client device;

processing a reverse mapping query to obtain the hostname of the host server, wherein the reverse mapping query comprises the source IP address of the client device in combination with the destination IP address of the host server; and obtaining the hostname of the host server in response to the reverse mapping query.

12. The DNS proxy process of claim 11, wherein the internal logic code comprises further instructions to perform further operations comprising:
: sending the destination IP address of the host server to the client device; and
: storing the reverse mapping in the local cache after obtaining the destination IP address and before sending the destination IP address to the client device.

13. The DNS proxy process of claim 11, wherein the internal logic code comprises further instructions to perform further operations comprising:
: selecting a single destination IP address from a plurality of destination IP addresses corresponding to the hostname of the host server; and
: discarding all of the destination IP addresses except for the selected destination IP address.

14. The DNS proxy process of claim 11, wherein the internal logic code comprises further instructions to perform further operations comprising setting a TTL parameter to zero, wherein the TTL parameter is indicative of a time during which the forward mapping is considered valid.

15. The DNS proxy process of claim 11, wherein the internal logic code comprises further instructions to perform further operations comprising:
: receiving a reverse mapping query from a corresponding intermediate server, wherein the reverse mapping query comprises a combination of the destination IP address for the host server and the source IP address for the client device;
: determining that a reverse mapping for the combination of the destination and source IP addresses is not located in the local cache; and
: foregoing contacting an authoritative DNS server to perform a reverse mapping operation based on the combination of the destination and source IP addresses.

16. The DNS proxy process of claim 11, wherein the internal logic code comprises further instructions to perform further operations comprising storing the following as part of the reverse mapping:
: a domain key comprising the combination of the destination and source IP addresses;
: the hostname of the host server; and
: a time-to-live (TTL) parameter indicative of a time during which the reverse mapping is considered valid.

17. The DNS proxy process of claim 16, wherein the domain key comprises a concatenation of the following:
: the source IP address, in reverse order, for the client device;
: the destination IP address, in reverse order, for the host server; and
: a reverse lookup string.

18. An intermediate server of a domain name system (DNS) server, the intermediate server comprising:
: internal logic code stored on a computer readable storage device, the internal logic code comprising instructions to perform operations, when executed on a computer, for processing network packet requests, wherein the operations comprise:
: : using a forward mapping to obtain a destination internet protocol (IP) address for a host server based on a corresponding hostname received from a client device;
: : receiving a network packet from the client device, wherein the network packet comprises the destination IP address corresponding to the host server;
: : combining the destination IP address for the host server with a source IP address for the client device;
: : sending a reverse mapping query to a corresponding DNS proxy process to obtain a hostname of the host server based on a reverse mapping which correlates the hostname with the combined destination IP address for the host server and the source IP address for the client device, wherein the reverse mapping query comprises the combined destination and source IP addresses; and
: : receiving the hostname of the host server from the DNS proxy process in response to the reverse mapping query.

19. The intermediate server of claim 18, wherein the internal logic code comprises further instructions to perform operations to maintain a log of hostnames, including the hostname for the host server, corresponding to the source IP address of the client device.

* * * * *